(12) United States Patent
Mei et al.

(10) Patent No.: US 9,807,473 B2
(45) Date of Patent: Oct. 31, 2017

(54) JOINTLY MODELING EMBEDDING AND TRANSLATION TO BRIDGE VIDEO AND LANGUAGE

(71) Applicant: Microsoft Technology Licensing, LLC, Redmond, WA (US)

(72) Inventors: Tao Mei, Beijing (CN); Ting Yao, Beijing (CN); Yong Rui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/946,988

(22) Filed: Nov. 20, 2015

(65) Prior Publication Data
US 2017/0150235 A1     May 25, 2017

(51) Int. Cl.
| H04N 5/445 | (2011.01) |
| H04N 21/8405 | (2011.01) |
| G06F 17/27 | (2006.01) |
| G06K 9/00 | (2006.01) |
| G06N 3/08 | (2006.01) |

(52) U.S. Cl.
CPC ....... *H04N 21/8405* (2013.01); *G06F 17/274* (2013.01); *G06F 17/2785* (2013.01); *G06K 9/00718* (2013.01); *G06N 3/08* (2013.01)

(58) Field of Classification Search
CPC ... G06N 3/08; G06F 17/2785; H04N 21/8405
USPC .................................. 704/9; 706/25; 725/53
See application file for complete search history.

(56) References Cited

U.S. PATENT DOCUMENTS

| 7,143,434 | B1* | 11/2006 | Paek ................. G06F 17/30858 345/619 |
| 9,263,036 | B1* | 2/2016 | Graves ..................... G10L 15/16 |
| 9,508,340 | B2* | 11/2016 | Parada San Martin .................. G06F 1/3203 |
| 9,519,858 | B2* | 12/2016 | Zweig ....................... G06N 3/04 |
| 2004/0015459 | A1* | 1/2004 | Jaeger ..................... G06N 3/08 706/15 |
| 2005/0208457 | A1 | 9/2005 | Fink et al. |
| 2007/0273696 | A1* | 11/2007 | Cheng ................ G06K 9/00771 345/467 |
| 2009/0232409 | A1 | 9/2009 | Marchesotti |
| 2010/0005485 | A1 | 1/2010 | Tian et al. |

(Continued)

OTHER PUBLICATIONS

Yao, et al., "Describing Videos by Exploiting Temporal Structure", In Proceedings of International Conference on Computer Vision, Retrieved on: Jul. 23, 2015, pp. 1-10.

(Continued)

*Primary Examiner* — Shaun Roberts

(57) ABSTRACT

Video description generation using neural network training based on relevance and coherence is described. In some examples, long short-term memory with visual-semantic embedding (LSTM-E) can maximize the probability of generating the next word given previous words and visual content and can create a visual-semantic embedding space for enforcing the relationship between the semantics of an entire sentence and visual content. LSTM-E can include a 2-D and/or 3-D deep convolutional neural networks for learning powerful video representation, a deep recurrent neural network for generating sentences, and a joint embedding model for exploring the relationships between visual content and sentence semantics.

20 Claims, 10 Drawing Sheets

(56) References Cited

U.S. PATENT DOCUMENTS

| | | | |
|---|---|---|---|
| 2011/0072466 A1* | 3/2011 | Basso | G06F 17/30796 725/47 |
| 2011/0093263 A1 | 4/2011 | Mowzoon | |
| 2011/0093343 A1* | 4/2011 | Hatami-Hanza | G06F 17/30026 705/14.64 |
| 2011/0182469 A1* | 7/2011 | Ji | G06K 9/4628 382/103 |
| 2014/0079297 A1 | 3/2014 | Tadayon et al. | |

OTHER PUBLICATIONS

Mao, et al., "Deep Captioning With Multimodal Recurrent Neural Networks (M-Rnn)", In Proceedings of International Conference on Learning Representations, May 7, 2015, 14 pages.

Vinyals, et al., "A Picture is Worth a Thousand (Coherent) Words: Building a Natural Description of Images", Published on: Nov. 17, 2014, at: Available at: http://googleresearch.blogspot.in/2014/11/a-picture-is-worth-thousand-coherent. html, 4 pgs.

Xu, et al., "Show, Attend and Tell: Neural Image Caption Generation with Visual Attention", In Proceedings of the 32nd International Conference on Machine Learning, Jul. 6, 2015, 22 pages.

Patel, et al., "Semantic Image Search Using Queries", Retrieved on: Jul. 23, 2015, Available at: http://cs224d.stanford.edu/reports/PatelShabaz.pdf, 7 pgs.

Rohrbach, et al., "The Long-Short Story of Movie Description", In Proceedings of Computing Research Repository, Jun. 2015, pp. 1-16.

Xi, et al., "Image Caption Automatic Generation Method based on Weighted Feature", In Proceedings of 13th International Conference on Control, Automation and Systems, Oct. 20, 2013, pp. 548-551.

Kiros, et al., "Generating Image Captions with Neural Network", Published on: Jan. 30, 2015, Available at: http://www.iro.umontreal.ca/~bengioy/cifar/NCAP2014-summerschool/slides/ryan_kiros_cifar2014kiros.pdf, 24 pgs.

Palangi, et al., "Deep Sentence Embedding Using the Long Short Term Memory Network", Retrieved on: Jul. 23, 2015 Available at: http://arxiv.org/pdf/1502.06922.pdf, 20 pgs.

Chen, et al., "Mind's Eye: A Recurrent Visual Representation for Image Caption Generation", In Proceedings of Conference on Computer Vision and Pattern Recognition, Jun. 7, 2015, 10 pages.

Gupta, et al., "Choosing Linguistics over Vision to Describe Images", In Proceedings of the Twenty-Sixth AAAI Conference on Artificial Intelligence, Jul. 22, 2012, pp. 606-612.

Devlin, et al., "Language Models for Image Captioning: The Quirks and What Works", In Proceedings of Computing Research Repository, May, 2015, 6 pages.

Feng, et al., "Automatic Caption Generation for News Images", In IEEE Transactions on Pattern Analysis and Machine Intelligence, vol. 35, Issue 4, Apr. 2013, pp. 797-812.

Bahdanau, et al., "Neural Machine Translation by Jointly Learning to Align and Translate", In Proceedings of International Conference on Learning Representations, May 7, 2015, pp. 1-15.

Banerjee, et al., "METEOR: An Automatic Metric for MT Evaluation with Improved Correlation with Human Judgments", In Proceedings of ACL Workshop on Intrinsic and Extrinsic Evaluation Measures for Machine Translation and/or Summarization, Jun. 2005, 8 pages.

Barnard, et al., "Matching Words and Pictures", In Journal of Machine Learning Research, Feb. 2003, pp. 1107-1135.

Bengio, "Learning Long-Term Dependencies with Gradient Descent is Difficult", In Journal of IEEE Transactions on Neural Networks, vol. 5 Issue 2, Mar. 1994, pp. 157-166.

Chen, et al., "Collecting Highly Parallel Data for Paraphrase Evaluation", In Proceedings of 49th Annual Meeting of the Association for Computational Linguistics: Human Language Technologies—vol. 1, Jun. 19, 2011, pp. 190-200.

Donahue, et al., "Long-term Recurrent Convolutional Networks for Visual Recognition and Description", In Journal of Computing Research Repository, Nov. 2014, 13 pages.

Fang, et al., "From Captions to Visual Concepts and Back", In Proceedings of Computer Vision and Pattern Recognition Conference, Jun. 8, 2015, 10 pages.

Farhadi, et al., "Every Picture Tells a Story: Generating Sentences from Images", In Proceedings of 11th European Conference on Computer Vision, Sep. 5, 2010, pp. 1-14.

Graves, et al., "Towards End-to-End Speech Recognition with Recurrent Neural Networks", In Proceedings of 31st International Conference on Machine Learning, Jun. 22, 2014, 9 pages.

Graves, et al., "Framewise Phoneme Classification with Bidirectional LSTM and Other Neural Network Architectures", In Journal of Neural Networks, vol. 18, Issue 5-6, Jun. 2005, 8 pages.

Guadarrama, et al., "YouTube2Text: Recognizing and Describing Arbitrary Activities Using Semantic Hierarchies and Zero-shot Recognition", In Proceedings of 14th International Conference on Computer Vision, Dec. 3, 2013, pp. 2712-2719.

Hochreiter, et al., "Long Short-Term Memory", In Journal of Neural Computation, vol. 9, Issue 8, Nov. 1997, pp. 1-32.

Jia, et al., "Learning cross-modality similarity for multinomial data", In Proceedings of the International Conference on Computer Vision, Nov. 6, 2011, 8 pages.

Karpathy, et al., "Deep visual-semantic alignments for generating image descriptions", In Proceedings of Computer Vision and Pattern Recognition, Jun. 7, 2015, 17 pages.

Karpathy, et al., "Large-scale video classification with convolutional neural networks", In Proceedings of Computer Vision and Pattern Recognition, Jun. 24, 2014, 8 pages.

Kiros, et al., "Multimodal neural language models", In Proceedings of the 31th International Conference on Machine Learning, Jun. 21, 2014, pp. 1-14.

Kiros, et al., "Unifying visual-semantic embeddings with multimodal neural language models", In Proceedings of Topology, Algebra and Categories in Logic, Jun. 15, 2015, pp. 1-14.

Krizhevsky, et al., "Imagenet classification with deep convolutional neural networks", In Proceedings of Advances in Neural Information Processing Systems 25, Dec. 3, 2012, pp. 1-9.

Kulkarni, et al., "BabyTalk: Understanding and generating simple image descriptions", In Proceedings of IEEE Transactions on Pattern Analysis and Machine Intelligence, vol. 35, No. 12, Dec. 2013, pp. 2891-2903.

Mao, et al., "Explain images with multimodal recurrent neural networks", In Proceedings of Twenty-eighth Annual Conference on Neural Information Processing Systems, Dec. 8, 2014, pp. 1-9.

Martens, et al., "Learning recurrent neural networks with hessian-free optimization", In Proceedings of the 28th International Conference on Machine Learning, Jun. 28, 2011, 8 pages.

Papineni, et al., "BLEU: A method for automatic evaluation of machine translation", In Proceedings of the 40th Annual Meeting on Association for Computational Linguistics, Jul. 6, 2002, pp. 311-318.

Rohrbach, et al., "Translating video content to natural language descriptions", In Proceedings of IEEE International Conference on Computer Vision, Dec. 1, 2013, pp. 433-440.

Russakovsky, et al., "ImageNet Large Scale Visual Recognition Challenge", In International Journal of Computer Vision, Apr. 2015, pp. 1-43.

Simonyan, et al., "Very deep convolutional networks for large-Scale Image Recognition", In Proceedings of the Computing Research Repository, Sep. 2014, pp. 1-14.

Socher, et al., "Connecting Modalities: Semi-supervised Segmentation and Annotation of Images Using Unaligned Text Corpora", In Proceedings of IEEE Conference on Computer Vision and Pattern Recognition, Jun. 13, 2010, pp. 966-973.

Sutskever, et al., "Sequence to Sequence Learning with Neural Networks", In Proceedings of Advances in Neural Information Processing Systems, Dec. 8, 2014, pp. 1-9.

Szegedy, "Going Deeper with Convolutions", In Proceedings of the Computing Research Repository, Sep. 2014, pp. 1-12.

(56) References Cited

OTHER PUBLICATIONS

Thomason, et al., "Integrating Language and Vision to Generate Natural Language Descriptions of Videos in the Wild", In Proceedings of the 25th International Conference on Computational Linguistics, Aug. 23, 2014, pp. 1218-1227.

Tran, et al., "C3d: Generic Features for Video Analysis", In Proceedings of the Computing Research Repository, Dec. 2014, pp. 1-10.

Venugopalan, et al., "Sequence to sequence—video to text", In Proceedings of the Computing Research Repository, May 2015, pp. 1-10.

Venugopalan, et al., "Translating Videos to Natural Language Using Deep Recurrent Neural Networks", In Proceedings of the Computing Research Repository, Dec. 2014, 11 pages.

Vinyals, et al., "Show and Tell: A Neural Image Caption Generator", In Proceedings of the Computing Research Repository, Nov. 2014, pp. 1-9.

Xu, et al., "Jointly Modeling Deep Video and Compositional Text to Bridge Vision and Language in a Unified Framework", In Proceedings of Association for the Advancement of Artificial Intelligence, Jan. 25, 2015, 7 pages.

Yao, et al., "Video Description Generation Incorporating Spatio-Temporal Features and a Soft-Attention Mechanism", In Proceedings of the Computing Research Repository, Feb. 2015, 15 pages.

Zaremba, et al., "Learning to Execute", In Proceedings of the Computing Research Repository, Oct. 2014, pp. 10-25.

\* cited by examiner

FIG. 9

JOINTLY MODELING EMBEDDING AND TRANSLATION TO BRIDGE VIDEO AND LANGUAGE

BACKGROUND

Video has become ubiquitous on the Internet, broadcasting channels, as well as that generated by personal devices. This has encouraged the development of advanced techniques to analyze semantic video content for a wide variety of applications. These applications include editing, indexing, search and sharing. Recognition of videos has been fundamental predominantly focused on recognizing videos with a predefined yet very limited set of individual words.

Existing video description approaches mainly optimize the next word given the input video and previous words, while leaving the relationship between the semantics of the entire sentence and video content unexploited. As a result, the generated sentences can suffer from a lack of robustness. It is often the case that the output sentence from existing approaches may be contextually correct but the semantics (e.g., subjects, verbs or objects) in the sentence are incorrect.

SUMMARY

This document describes a facility for video description generation using long short-term memory with visual-semantic embedding (LSTM-E).

In some examples, LSTM-E can simultaneously explore the learning of LSTM and visual-semantic embedding. The LSTM can maximize the probability of generating the next word given previous words and visual content, while visual-semantic embedding can create a visual-semantic embedding space for enforcing the relationship between the semantics of an entire sentence and visual content. LSTM-E can include three components: a two dimensional (2D) and/or three dimensional (3D) deep convolutional neural networks for learning powerful video representation, a deep RNN for generating sentences and a joint embedding model for exploring the relationships between visual content and sentence semantics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The terms "techniques" for instance, may refer to method(s) and/or computer-executable instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or "facility," for instance, may refer to hardware logic and/or other system(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 9 shows a comparison of outputs from current examples and currently known solutions.

DETAILED DESCRIPTION

Figure 1:
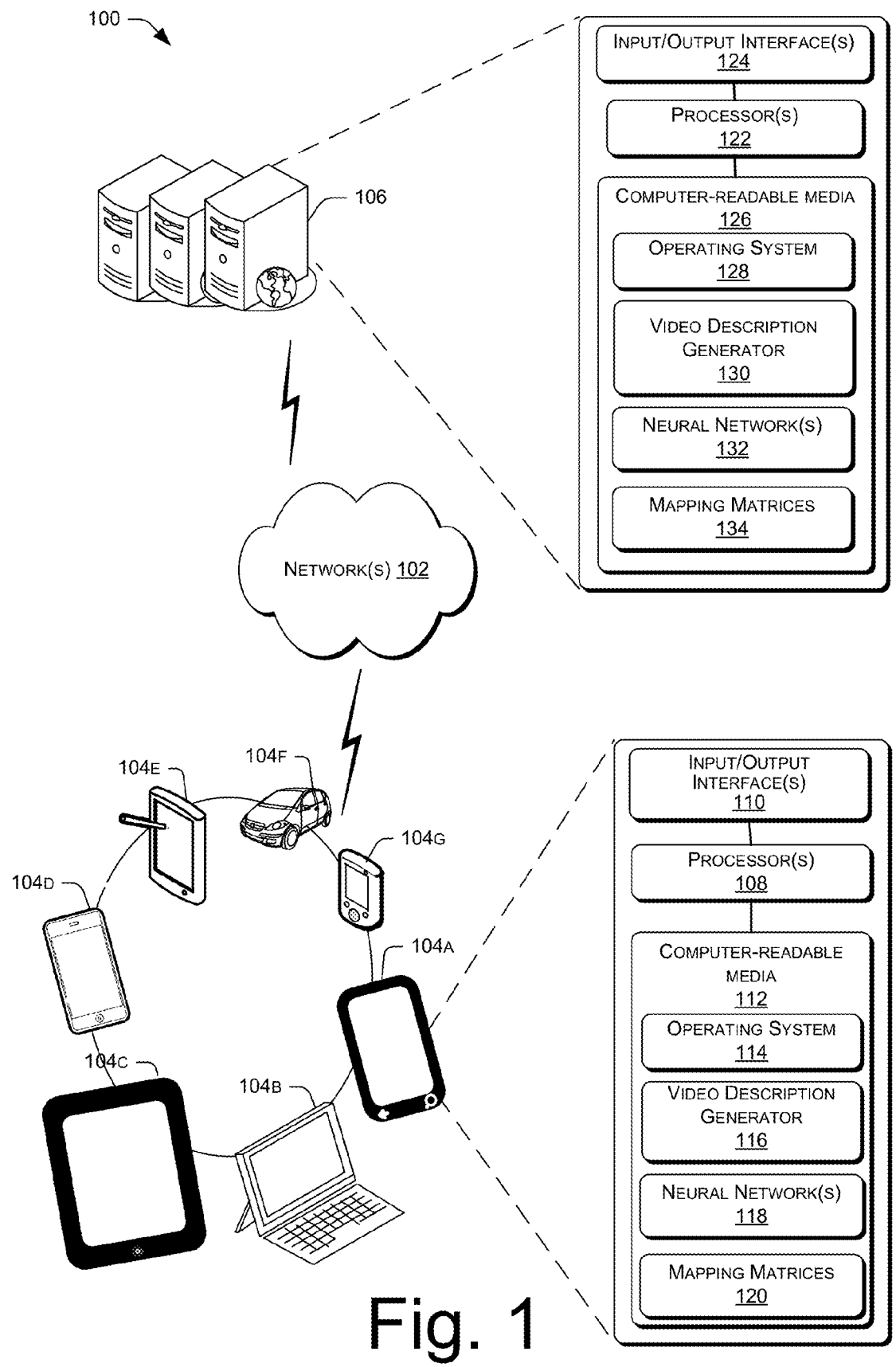
FIG. 1 is a pictorial diagram of an example of a environment for performing video description generation.

Concepts and technologies are described herein for determining a description for inputted video using video and sentence embedding into mapping matrices and long short-term memory (LSTM)-type recurrent neural networks (RNN) trained to minimize relevance loss and coherence loss.

Overview

Current systems that provide sentence identification for video do not have the ability to effectively identify sentences that have both relevance and coherence to images presented in the video and sentence. The volume of videos available over the Internet presents a daunting task of how to label and search these videos. Without effective labeling of videos, browsing these videos is tedious and a near impossible task. Recent development of recurrent neural networks (RNN) provide automatic description of video content with a complete and natural sentence.

In some examples, the technology described herein describes understanding and describing videos.

In one example, a system can use semantics of an entire sentence and visual content to learn a visual semantic embedding model. An LSTM with visual-semantic embedding (LSTM-E) framework can identify relationships between video content and the natural language of an input sentence. A 2-D and/or 3-D convolution neural networks (CNN) can extract visual features of selected video frames/clips. Mean pooling can combine the extracted visual features to produce a representation of the video (e.g., as a feature vector). An LSTM and a visual-semantic embedding model can jointly train/learn based on the video representation and a descriptive sentence input by a training administrator. This joint learning can minimize coherence loss and relevance loss. Coherence can express the contextual relationships among the words of the input descriptive sentence with content in the video representation. LSTM-E can optimize coherence. Relevance can convey the relationship between semantics of the entire input descriptive sentence and video content. This produces a visual-semantic embedding model and LSTM that can determine a descriptive sentence for an input video. LSTM-E can optimize relevance and coherence by adjusting parameters associated with the visual-semantic embedding. The relevance loss is measured in the visual-semantic embedding space and the coherence loss is calculated on the generated words in the sentence in LSTM. During learning, the gradients are back-propagated to LSTM so that LSTM can adjust their parameters to minimize the coherence loss. Similar in spirit, the gradients are back-propagated to video embedding and sentence embedding (visual-semantic embedding) so that these two embeddings can adjust their parameters to minimize the sum of relevance and coherence losses.

The following detailed description refers to the accompanying drawings. Wherever possible, the same reference numbers are used in the drawing and the following description to refer to the same or similar elements. While an example may be described, modifications, adaptations, and other examples are possible. For example, substitutions, additions, or modifications may be made to the elements illustrated in the drawings, and the methods described herein may be modified by substituting, reordering, or adding stages to the disclosed methods. Accordingly, the following detailed description does not provide limiting disclosure, but instead, the proper scope is defined by the appended claims.

Environment

Referring now to the drawings, in which like numerals represent like elements, various examples will be described.

The architecture described below constitutes but one example and is not intended to limit the claims to any one particular architecture or operating environment. Other architectures may be used without departing from the spirit and scope of the claimed subject matter. FIG. 1 is a diagram of an example environment for implementing video description generation.

In some examples, the various devices and/or components of environment 100 include one or more network(s) 102 over which a consumer device 104 may be connected to at least one server 106. The environment 100 may include multiple networks 102, a variety of consumer devices 104, and/or one or more servers 106.

In various examples, server(s) 106 can host a cloud-based service or a centralized service, which can be particular to an entity such as a company. Examples support scenarios where server(s) 106 can include one or more computing devices that operate in a cluster or other grouped configuration to share resources, balance load, increase performance, provide fail-over support or redundancy, or for other purposes over network 102. Server(s) 106 can belong to a variety of categories or classes of devices such as traditional server-type devices, desktop computer-type devices, mobile devices, special purpose-type devices, embedded-type devices, and/or wearable-type devices. Server(s) 106 can include a diverse variety of device types and are not limited to a particular type of device. Server(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

For example, network(s) 102 can include public networks such as the Internet, private networks such as an institutional and/or personal intranet, or some combination of private and public networks. Network(s) 102 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 102 can utilize communications protocols, including packet-based and/or datagram-based protocols such as internet protocol (IP), transmission control protocol (TCP), user datagram protocol (UDP), or other types of protocols. Moreover, network(s) 102 can also include a number of devices that facilitate network communications and/or form a hardware basis for the networks, such as switches, routers, gateways, access points, firewalls, base stations, repeaters, backbone devices, and the like.

In some examples, network(s) 102 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, consumer devices 104 include devices such as devices 104A-104G. Examples support scenarios where device(s) 104 can include one or more computing devices that operate in a cluster or other grouped configuration to share resources or for other purposes. Consumer device(s) 104 can belong to a variety of categories or classes of devices such as traditional client-type devices, desktop computer-type devices, mobile devices, special purpose-type devices, embedded-type devices and/or wearable-type devices. Although illustrated as a diverse variety of device types, device(s) 104 can be other device types and are not limited to the illustrated device types. Consumer device(s) 104 can include any type of computing device with one or multiple processor(s) 108 operably connected to an input/output (I/O) interface(s) 110 and computer-readable media 112. Consumer devices 104 can include computing devices such as, for example, smartphones 104A, laptop computers 104B, tablet computers 104C, telecommunication devices 104D, personal digital assistants (PDAs) 104E, automotive computers such as vehicle control systems, vehicle security systems, or electronic keys for vehicles (e.g., 104F, represented graphically as an automobile), a low-resource electronic device (e.g., Internet of things (IoT) device) 104G and/or combinations thereof. Consumer devices 104 can also include electronic book readers, wearable computers, gaming devices, thin clients, terminals, and/or work stations. In some examples, consumer devices 104 can be desktop computers and/or components for integration in a computing device, appliances, or another sort of device.

In some examples, as shown regarding consumer device 104A, computer-readable media 112 can store instructions executable by processor(s) 108 including operating system 114, video description generator 116, and other modules, programs, or applications, such as neural network(s) 118 and mapping matrices 120, that are loadable and executable by processor(s) 108 such as a central processing unit (CPU) or a graphics processing unit (GPU). Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Consumer device(s) 104 can further include one or more I/O interfaces 110 to allow a consumer device 104 to communicate with other devices. I/O interfaces 110 of a consumer device 104 can also include one or more network interfaces to enable communications between computing consumer device 104 and other networked devices such as other device(s) 104 and/or server(s) 106 over network(s) 102. I/O interfaces 110 of a consumer device 104 can allow a consumer device 104 to communicate with other devices such as user input peripheral devices (e.g., a keyboard, a mouse, a pen, a game controller, an audio input device, a visual input device, a touch input device, gestural input device, and the like) and/or output peripheral devices (e.g., a display, a printer, audio speakers, a haptic output, and the like). Network interface(s) can include one or more network interface controllers (NICs) or other types of transceiver devices to send and receive communications over a network.

Server(s) 106 can include any type of computing device with one or multiple processor(s) 122 operably connected to an input/output interface(s) 124 and computer-readable media 126. Multiple servers 106 can distribute functionality, such as in a cloud-based service. In some examples, as shown regarding server(s) 106, computer-readable media 126 can store instructions executable by the processor(s) 122 including an operating system 128, video description generator 130, neural network(s) 132, mapping matrices 134 and other modules, programs, or applications that are loadable and executable by processor(s) 122 such as a CPU and/or a GPU. Alternatively, or in addition, the functionally described herein can be performed, at least in part, by one or more hardware logic components. For example, and without limitation, illustrative types of hardware logic components that can be used include FPGAs, ASICs, ASSPs, SOCs, CPLDs, etc.

I/O interfaces 124 can allow a server 106 to communicate with other devices such as user input peripheral devices (e.g., a keyboard, a mouse, a pen, a game controller, an audio input device, a video input device, a touch input device, gestural input device, and the like) and/or output peripheral devices (e.g., a display, a printer, audio speakers, a haptic output, and the like). I/O interfaces 110 of a server 106 can also include one or more network interfaces to enable communications between computing server 106 and other networked devices such as other server(s) 106 or devices 104 over network(s) 102.

Computer-readable media 112, 126 can include, at least, two types of computer-readable media, namely computer storage media and communications media.

Computer storage media 112, 126 can include volatile and non-volatile, removable and non-removable media implemented in any method or technology for storage of information such as computer readable instructions, data structures, program modules, or other data. Computer storage media can include tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium or memory technology or any other non-transmission medium that can be used to store and maintain information for access by a computing device.

In contrast, communication media may embody computer-readable instructions, data structures, program modules, or other data in a modulated data signal, such as a carrier wave, or other transmission mechanism.

As defined herein, computer storage media does not include communication media exclusive of any of the hardware components necessary to perform transmission. That is, computer storage media does not include communications media consisting solely of a modulated data signal, a carrier wave, or a propagated signal, per se.

Server(s) 106 can include programming to send a user interface to one or more device(s) 104. Server(s) 106 can store or access a user profile, which can include information a user has consented the entity collect such as a user account number, name, location, and/or information about one or more consumer device(s) 104 that the user can use for sensitive transactions in untrusted environments.

Figure 2:
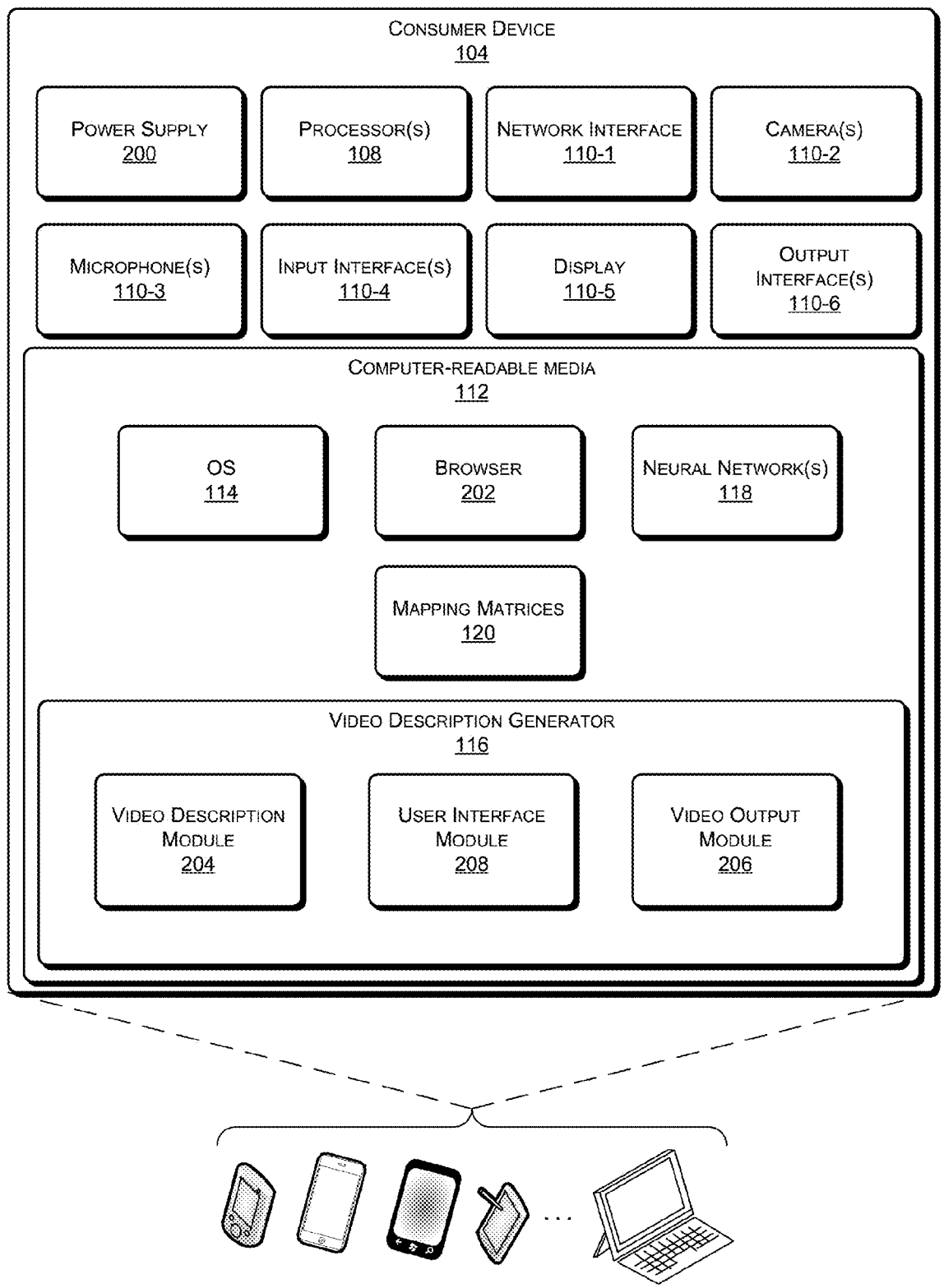
FIG. 2 is a pictorial diagram of part of an example consumer device from the environment of FIG. 1.

FIG. 2 illustrates select components of an example consumer device 104 configured to identify a text description for video. An example consumer device 104 can include a power supply 200, one or more processors 108 and I/O interface(s) 110. I/O interface(s) 110 can include a network interface 110-1, one or more cameras 110-2, one or more microphones 110-3, and in some instances additional input interface 110-4. The additional input interface(s) can include a touch-based interface and/or a gesture-based interface. Example I/O interface(s) 110 can also include a display 110-5 and in some instances can include additional output interface 110-6 such as speakers, a printer, etc.

Network interface 110-1 enables consumer device 104 to send and/or receive data over network 102. Network interface 110-1 can also represent any combination of other communication interfaces to enable consumer device 104 to send and/or receive various types of communication, including, but not limited to, web-based data and cellular telephone network-based data. Computer-readable media 112 can store operating system (OS) 114, browser 202, neural network(s) 118, mapping matrices 120, video description generator 116 and any number of other applications or modules, which are stored as computer-readable instructions, and are executed, at least in part, on processor 108.

Video description generator 116 can include video description module 204, video output module 206 and user interface module 208. Video description module 204 can identify relevant and coherent text/sentence(s) for an inputted video using trained neural network(s) 118 and trained mapping matrices 120. Training is described by example in FIGS. 4 and 7.

Video output module 206 can provide the identified text/sentence(s) in response to various actions (e.g., search). For example, the identified text/sentence(s) can be provided to a search engine or to a searchable database.

User interface module 208 can interact with I/O interfaces(s) 110. User interface module 208 can present a graphical user interface (GUI) at I/O interface 110. GUI can include features for allowing a user to interact with video description module 204, video output module 206 or components of video description generator 130 at server 106.

Features of the GUI can allow a user to select video for analysis and view identified text/sentence(s) at consumer device 104.

Figure 3:
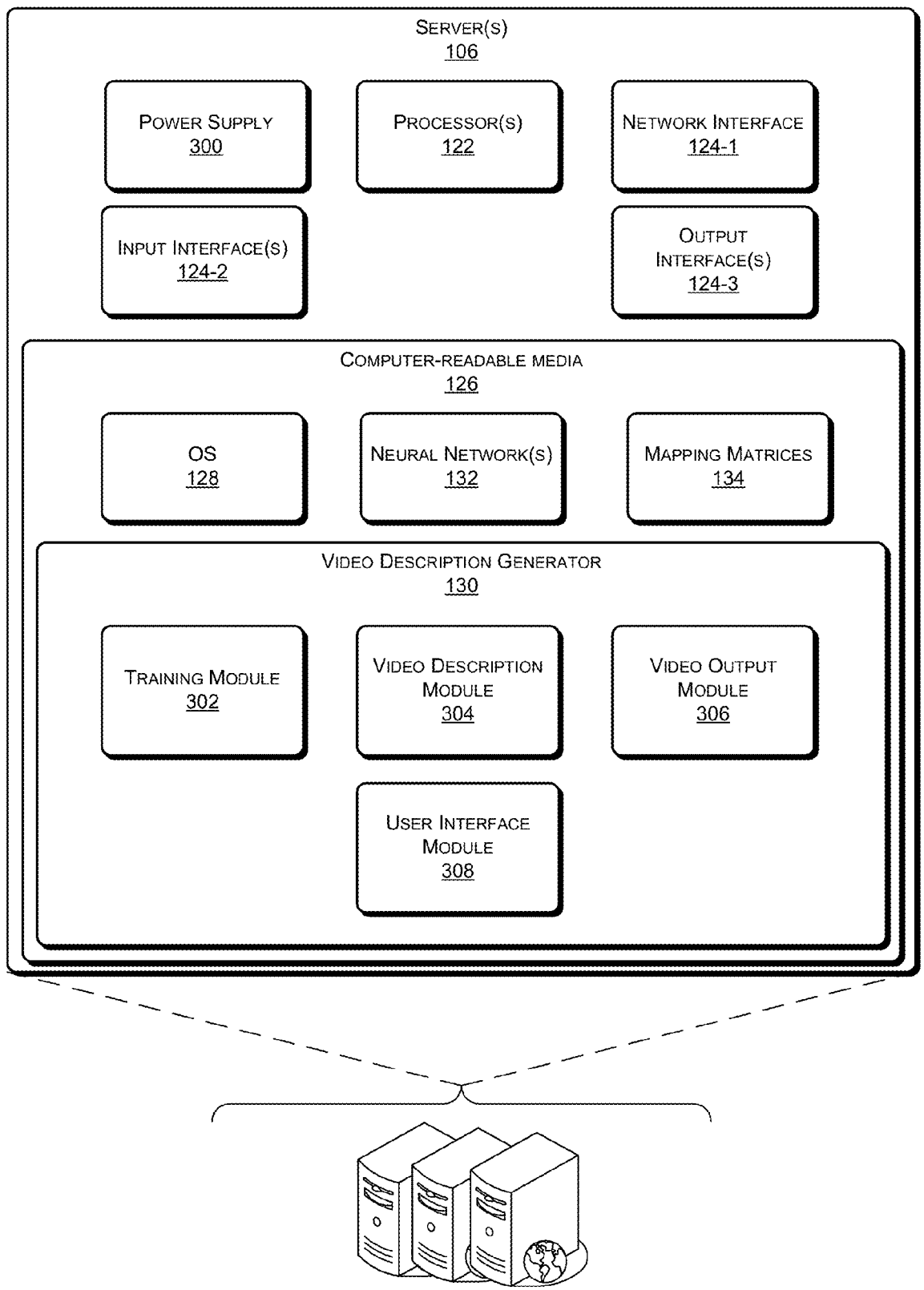
FIG. 3 is a pictorial diagram of an example server from the environment of FIG. 1.

FIG. 3 is a block diagram that illustrates select components of an example server device 106 configured to provide video description determination and output as described herein. Example server 106 can include a power supply 300, one or more processors 122 and I/O interfaces corresponding to I/O interface(s) 124 including a network interface 124-1, and in some instances may include one or more additional input interfaces 124-2, such as a keyboard, soft keys, a microphone, a camera, etc. In addition, I/O interface 124 can also include one or more additional output interfaces 124-3 including output interfaces such as a display, speakers, a printer, etc. Network interface 124-1 can enable server 106 to send and/or receive data over network 102. Network interface 124-1 may also represent any combination of other communication interfaces to enable server 106 to send and/or receive various types of communication, including, but not limited to, web-based data and cellular telephone network-based data. Computer-readable media 126 can store operating system (OS) 128, video description generator 130, neural network(s) 132, mapping matrices 134 and any number of other applications or modules, which are stored as computer-executable instructions, and are executed, at least in part, on processor 122.

Figure 4:
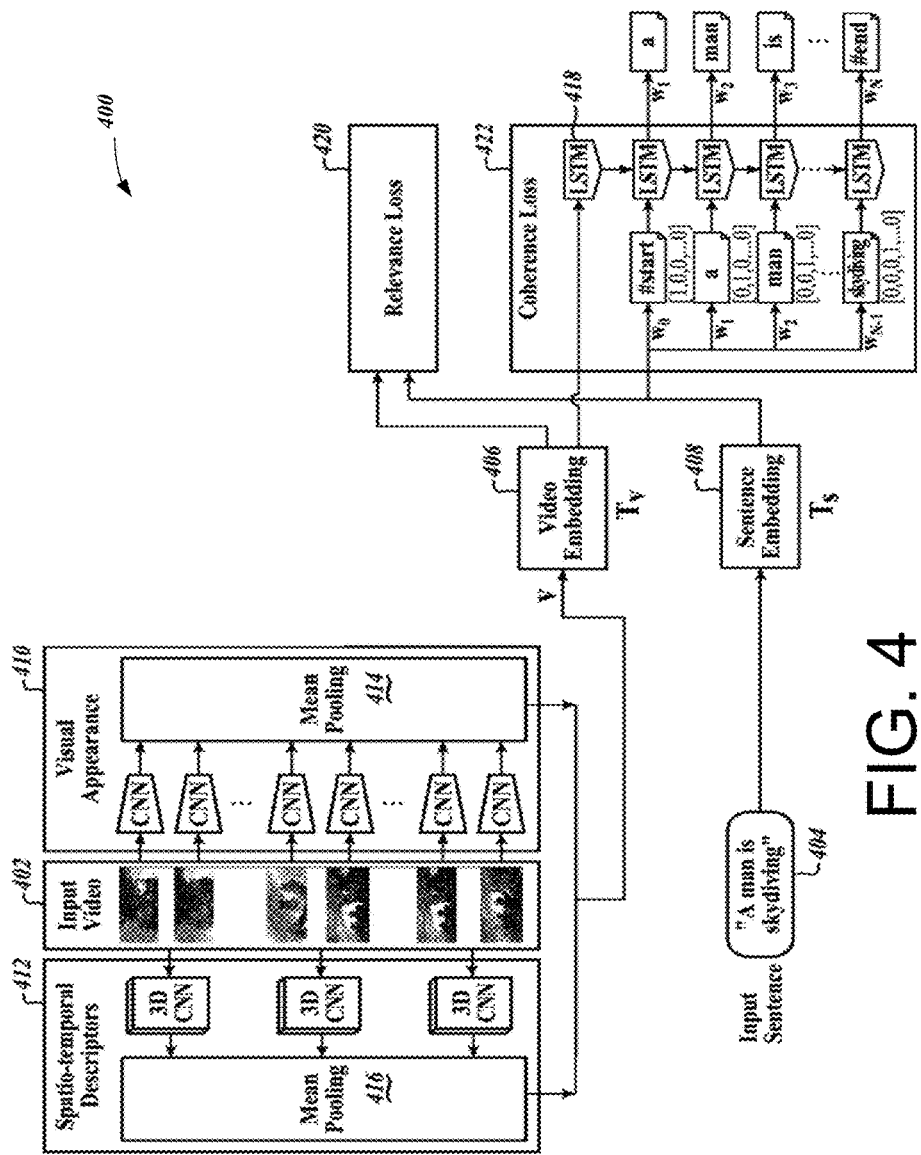
FIG. 4 is a block diagram that illustrates an example training process.
Figure 7:
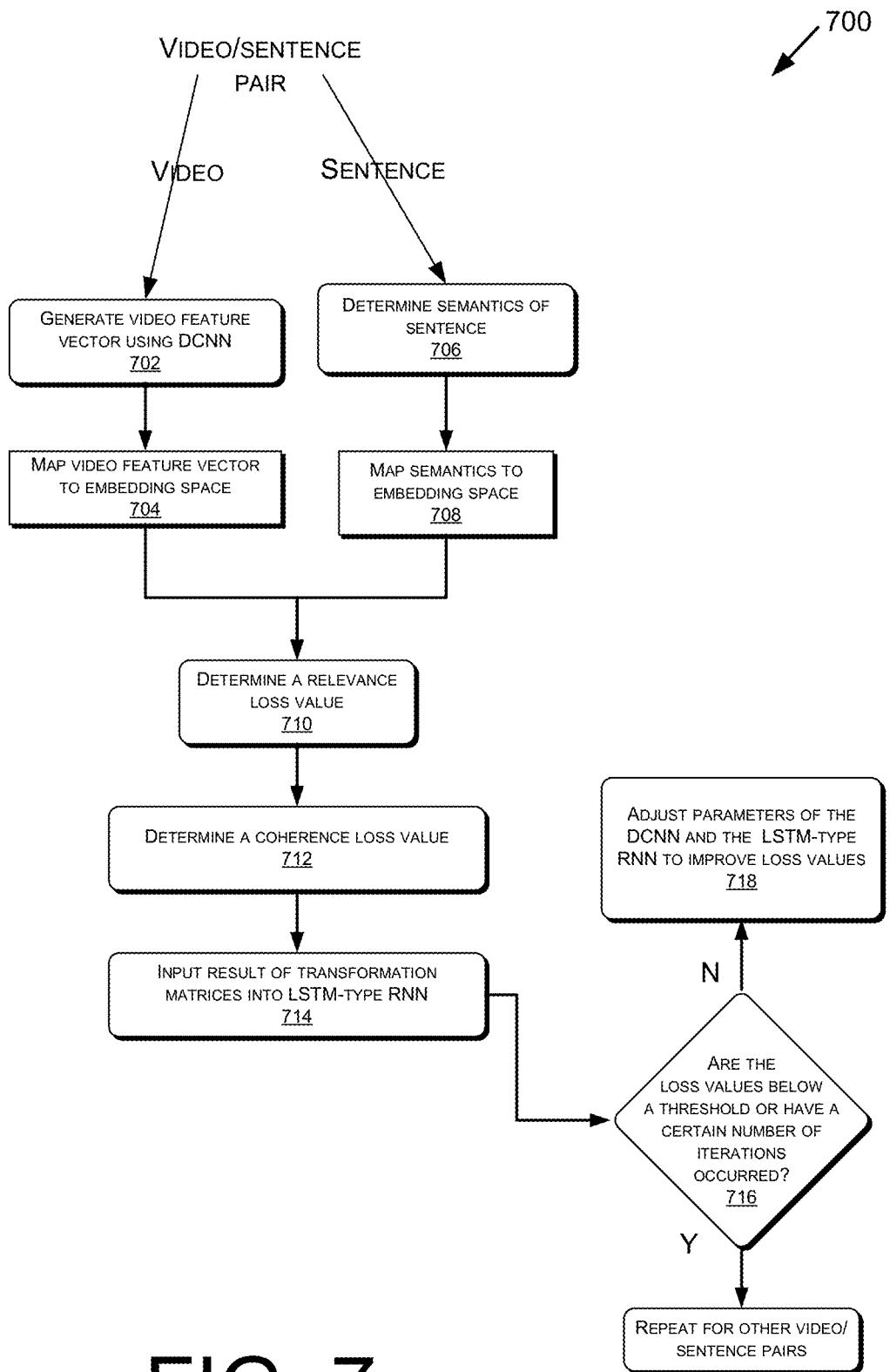
FIG. 7 shows a flow diagram of an example process for training at least some components of the environment of FIG. 1.

Video description generator 130 can include training module 302, video description module 304, video output module 306 and user interface module 308. Training module 302 can train and store neural networks(s) 132 or mapping matrices 134 using previously identified video with previously identified descriptive text/sentence(s). FIGS. 4 and 7 describe example training processes of neural network(s) 132 and mapping matrices 134. Training module 302 can be replicated in part or whole at consumer device 104, can include components that compliment other training module components or can be unique versions.

Video description module 304 can identify a text string/sentence(s) for a consumer identified video using the trained neural network(s) 132 and mapping matrices 134. Video description module 304 can be similar to video description module 204 located at consumer device 104, can include components that compliment video description module 204 or can be unique versions.

Video output module 306 can format/output the identified text string/sentence(s) for viewing by the customer who identified video or by other customers. User interface module 308 can interact with I/O interfaces(s) 124 and with I/O interfaces(s) 110 of consumer device 104. User interface module 308 can present a GUI at I/O interface 124. GUI can include features for allowing a user to interact with training module 302, video description module 304, video output module 306 or other components of video description generator 130. The GUI can be presented in a website for presentation to users at consumer device 104.

Example Operation

FIGS. 4 and 6-8 illustrate example processes for implementing aspects of video description detection for output as described herein. These processes are illustrated as collections of blocks in logical flow graphs, which represent a sequence of operations that can be implemented in hardware, software, or a combination thereof. In the context of software, the blocks represent computer-executable instructions on one or more computer-readable media that, when executed by one or more processors, cause the processors to perform the recited operations.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while the processes are described with reference to consumer device 104 and server 106 described above with reference to FIGS. 1-3, in some examples other computer architectures including other cloud-based architectures as described above may implement one or more portions of these processes, in whole or in part.

FIG. 4 shows an example process 400 for training video and sentence mapping matrices and LSTM-type RNN using one example video/sentence pairs. An administrator of the training can verify that a sentence 404 of a pair is a good match with a video 402 of the pair. Video V 402 can include N sample frames/clips and an input textual sentence S, where $S=\{w_2, w_2, \ldots, w_{N_s}\}$, can include $N_s$ words. $v \in \mathbb{R}^{D_v}$ and $w_t \in \mathbb{R}^{D_w}$ can denote $D_v$-dimensional visual features of a video V and the $D_w$-dimensional textual features of the t-th word in sentence S, respectively. $D_w \times N_s$ matrix $W \equiv [w_1, w_2, \ldots, w_{N_s}]$ can represent a sentence. Each word in the sentence can be a column vector of the matrix. s can be a feature vector that can represent a sentence as a whole. The administrator can select the descriptive sentence 404 for depicting the main contents of the associated video 402. Training module 302 can cause processor 122 to minimize the following energy loss function using many hundreds to thousands of matched pairs of videos and sentences:

$$E(V,S)=(1-\lambda) \times E_r(v,s) + \lambda \times E_c(v,W) \quad (1)$$

where $E_r(v, s)$ and $E_c(v,W)$ represent the relevance loss and coherence loss, respectively. $E_r(v, s)$ measures relevance between content of the video and sentence semantics purpose. Video embedding space 406 can adjust mapping matrices for optimizing relevance between the video content and the sentence semantics. $E_c(v,W)$ can estimate the contextual relationships among the words in the input sentence. Process 400 can use the mapping matrices and an LSTM-based RNN to identify the contextual relationships. A positive parameter $\lambda$ can capture the tradeoff between the two competing losses $E_r(v, s)$ and $E_c(v,W)$.

2-D and/or 3-D deep convolutional neural networks (CNNs) 410, 412 can represent the visual content of the input video. The 2-D and/or 3-D CNNs 410, 412 can produce a representation of each sampled frame/clip from the video. A "mean pooling" process 412, 414 can generate a single $D_v$-dimension vector v for each video V using the frames/clips.

Feature vectors $w_t(t=1, 2, \ldots, N_s)$ of each word in the input sentence can produce sentence features. Training module 302 encodes each word $w_t$ as a binary index vector in a vocabulary, thus the dimension of feature vector $w_t$, i.e. $D_w$, is the vocabulary size. Training module 302 can calculate the binary TF weights over all words of the sentence to produce an integrated representation of the entire sentence, denoted by $s \in \mathbb{R}^{D_w}$, with the same dimension of $w_t$.

Training module 302 can derive a linear mapping function by $$v_e = T_v v \text{ and } s_e = T_s s, \quad (2)$$

where $D_e$ is the dimensionality of the embedding space, and $T_v \in \mathbb{R}^{D_e \times D_v}$ and $T_s \in \mathbb{R}^{D_e \times D_v}$ are the transformation matrices that project the video content and semantic sentence into the common embedding space (e.g., common space), respectively.

Training module 302 can measure the relevance at block between the video content and semantic sentence by computing the distance between the two mappings in the common embedding space. Thus, the relevance loss can be (block 420):

$$E_r(v,s) = \|T_v v - T_s s\|_2^2. \quad (3)$$

Training module 302 can strengthen the relevance between video content and semantic sentence by minimizing the relevance loss. Minimizing relevance loss is done by adjusting parameter(s) associated with the transformation matrices.

Training module 302 can define coherence loss as:

$$E_c(v,W) = -\log \Pr(W|v). \quad (4)$$

Training module 302 can represent a log of probability of the sentence is given by the sum of the log of probabilities over the word:

$$\log \Pr(W|v) = \sum_{t=0}^{N_s} \log \Pr(w_t|v, w_0, \ldots, w_{t-1}). \quad (5)$$

Training module 302 can minimize the coherence loss (block 422), thus making the sentence coherent and smooth. W is sentence embedding space.

Training module 302 can jointly model the relevance loss and coherence loss in a deep recurrent neural network (e.g., LSTM-type RNN). The coherence loss is calculated on the generated words in the sentence in LSTM. During learning, the module (block 422) can evaluate the coherence loss. Then, the gradients are back-propagated to LSTM so that LSTM can adjust their parameters to minimize the coherence loss.

A Long Short-Term Memory with visual semantic Embedding (LSTM-E) model can translate the video representation from a 2-D and/or 3-D CNN to the desired output sentence by using LSTM-type RNN model. Training module 302 can train LSTM-E by simultaneously minimizing the relevance loss and coherence loss. Therefore, the formulation presented in Eq. (1) is equivalent to minimizing the following energy function:

$$E(V,S) = (1-\lambda) \times \|T_v v - T_s s\|_2^2 - \lambda \times \sum_{t=0}^{N_s} \log \Pr((w_t|v, w_0, \ldots, w_{t-1}; \theta; T_v; T_s), \quad (6)$$

where $\theta$ are parameters.

Figure 5:
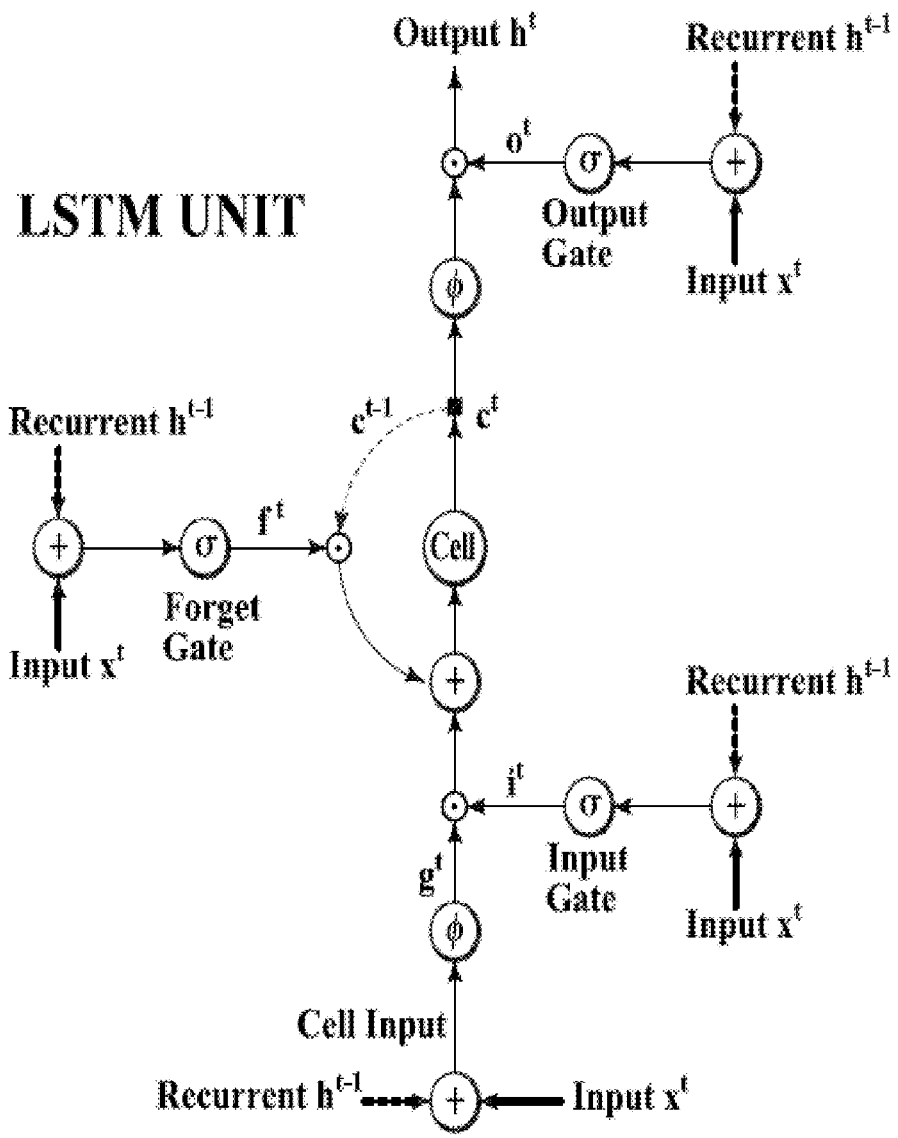
FIG. 5 shows an example long short-term memory (LSTM) recurrent neural network (RNN).

As shown in FIG. 5, an example LSTM unit can capture long-term temporal information by mapping input sequences to a sequence of hidden states and then hidden states to outputs. To address the vanishing gradients problem in traditional RNN training, LSTM incorporates a memory cell which can maintain its states over time and non-linear gating units which control the information flow into and out of the cell.

The LSTM unit can include a single memory cell, an input activation function, an output activation function, and three gates (input, forget and output). The hidden state of the cell is recurrently connected back to the input and three gates. The memory cell can update its hidden state by combining the previous cell state which is modulated by the forget gate and a function of the current input and the previous output, modulated by the input gate. The forget gate can control what is to be remembered and what is to be forgotten by the cell and can avoid the gradient from vanishing or exploding when back propagating through time. The cell state can map to $(-1,1)$ range through an output activation function which is necessary whenever the cell state is unbounded. The output gate can determine how much of the memory cell flows into the output. These additions to the single memory cell enable LSTM to capture extremely complex and long-term temporal dynamics.

The vector formulas for an LSTM layer are given below. For timestep t, $x_t$ and $h_t$ are the input and output vectors respectively, T are input weights matrices, R are recurrent weight matrices and b are bias vectors. Logic sigmoid $$\sigma(x) = \frac{1}{1 + e^{-x}}$$

and hyperbolic tangent $$\varphi(x) = \frac{e^x - e^{-x}}{e^x + e^{-x}}$$

are element-wise non-linear activation functions, mapping real numbers to $(0; 1)$ and $(-1; 1)$ separately. The dot product and sum of two vectors are denoted with $\odot$ and $\oplus$, respectively. Given inputs $x^t$, $h^{t-1}$ and $c^{t-1}$, the LSTM unit updates for timestep t are:

$$g^t = \phi(T_g x^t + R_g h^{t-1} + b_g) \quad \text{cell input}$$

$$i^t = \sigma(T_i x^t + R_i h^{t-1} + b_i) \quad \text{input gate}$$

$$f^t = \sigma(T_f x^t + R_f h^{t-1} + b_f) \quad \text{forget gate}$$

$$c^t = g^t \odot i^t + c^{t-1} \odot f^t \quad \text{cell state}$$

$$o^t = \sigma(T_o x^t + R_o h^{t-1} + b_o) \quad \text{output gate}$$

$$h^t = \phi(ct) \odot o^t \quad \text{cell output}$$

By further incorporating a visual-semantic embedding, LSTM-E architecture can jointly model embedding and translation. During training, the inputs of LSTM are the representations of the input video and the words in the input sentence after mapping into the embedding space. The training results in the LSTM model effectively predicting each word in the sentence given the embedding of the visual features and previous words. There are multiple ways that can be used to combine the visual features and words in LSTM unit updating procedure. One way is to feed the visual features at each time step as an extra input for LSTM to emphasize the visual features frequently among LSTM memory cells. A second way inputs the visual features once at the initial step to inform the memory cells in LSTM about the visual features. Given the input video v and the input sentence $W \equiv [w_0, w_1, \ldots, w_{N_s}]$, the LSTM updating procedure is as following:

$$x^{-1} = T_v v \quad (7)$$

$$x^t = T_s w_t, \ t \in \{0, \ldots, N_s - 1\} \quad (8)$$

$$h^t = f(x^t), \ t \in \{0, \ldots, N_s - 1\} \quad (9)$$

where f is the updating function within LSTM unit. For the input sentence $W \equiv \{w_0, w_1, w_{N_s}\}$, $w_0$ is the start sign word to inform the beginning of sentence and $w_{N_s}$ as the end sign word which indicates the end of sentence. More specifically, at the initial time step, the video representation in the embedding space is set as the input for LSTM, and then in the next steps, word embedding $x^t$ will be input into the LSTM along with the previous step's hidden state $h^{t-1}$. In each time step (except the initial step), the LSTM cell output $h^t$ can predict the next word. A softmax layer is applied after the LSTM to produce a probability distribution over all the $D_s$ words in the vocabulary as:

$$Pr_{t+1}(w_{t+1}) = \frac{\exp(T_h^{(w_{t+1})} h^t)}{\sum_{w \in W} \exp(T_h^{(w)} h^t)} \quad (10)$$

where W is the word vocabulary space, $T_h^{(w)}$ is the parameter matrix in softmax layer. The softmax layer is a layer on the top of LSTM. The softmax layer maps the outputs of LSTM to a probability of each word in the vocabulary. Therefore, training obtains the next word based on the probability distribution until the end sign word is emitted.

Accordingly, the loss function is as follows:

$$E(V,S) = (1-\lambda) \times \|T_v v - T_s s\|_2^2 - \lambda \times \Sigma_{t=1}^{N_s} \log Pr_t(w_t) \quad (11)$$

Because N denotes the number of video-sentence pairs in the training dataset, the following exists:

$$\min_{T_v, T_s, T_h, \theta} \frac{1}{N} \sum_{i=1}^{N} (E(V^{(i)}, S^{(i)})) + \|T_v\|_2^2 + \|T_s\|_2^2 + \|T_h\|_2^2 + \|\theta\|_2^2, \quad (12)$$

where the first term is the combination of the relevance loss and coherence loss, while the rest are regularization terms for video embedding, sentence embedding, softmax layer and LSTM, respectively. The regularization term $$(\|T_v\|_2^2, \|T_s\|_2^2, \|T_h\|_2^2, \|\theta\|_2^2)$$

is a penalty for complexity of each component. It aims to prevent overfitting.

Training can optimize over all the training video-sentence pairs using stochastic gradient descent. By minimizing Equation (12), LSTM-E takes into account both the contextual relationships (coherence) among the words in the input sentence and the relationships between the semantics of the entire sentence and video features (relevance).

Figure 6:
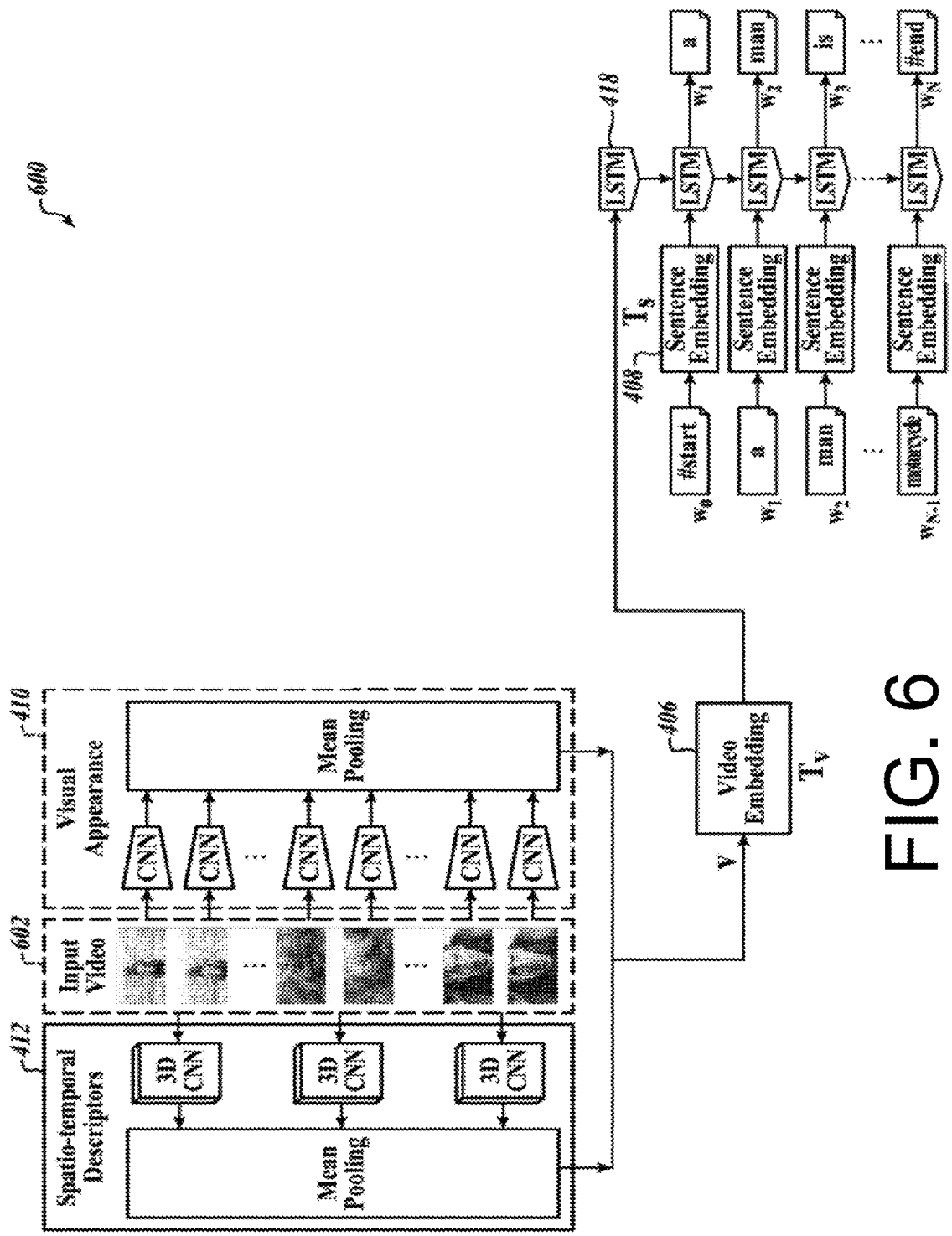
FIG. 6 is a block diagram that illustrates an example description generation process trained according to the example of FIG. 4.

As shown in FIG. 6, a process 600 of sentence generation performed by video description detection module 204, 304 is presented. In one example, video description detection module 204, 304 can include sampling an input video 602. Video description detection module 204, 304 can generate video features of the samplings using 2D and/or 3D CNNs 410, 412. Video description detection module 204, 304 can transform the video features into video embedding space 406 using the trained transformation matrix. LSTM 418 can identify words for a sentence describing the input video using the video features in the embedding space 406 and sentence semantics in sentence semantic space 408. At a first timestep, LSTM 418 can use a start word default. After determining the first word, LSTM 418 can use the previous word translated into sentence semantic space 408 for determining the next word until the end sign word is sampled or the maximum sentence size is reached.

In another example, video description detection module 204, 304 can select the top-k best sentence(s) for each timestep and sets them as the candidates for next timestep based on which to generate a new top-k best sentence(s) k can be set as 1. Therefore, at each timestep, LSTM can choose the word with maximum probability as the predicted word and can input its embedded feature in the next timestep until the model outputs the end sign word. The output of video embedding is the mapped video representation in the embedding space. It is the input of LSTM at the initial time step.

FIG. 7 illustrates an example process 700 for training components of a video description system. An administrator using training module 302 can select an input video/sentence pair to be used for training. The sentence selected is one that describes the video as determined by the administrator or by some other human participant. At block 702, a DCNN (e.g., 2D and/or 3D CNNs 410, 412) can generate a feature vector or similar representation of the input video. The administrator or another person previously trains the DCNN using previously identified input/output pairs (e.g., video and video feature vector).

At block 704, training module 302 can map/translate the description of the input video to an embedding space. Training module 302 can map/translate using a video description mapping/translation matrix (e.g., mapping matrices 120, 134).

At block 706, training module 302 can determine semantics of the input sentence. In one example, the semantics can include a vector of identified semantic features.

At block 708, training module 302 can map/translate the semantics of the input sentence into the embedding space. Training module 302 can map/translate using a semantics mapping/translation matrix (e.g., mapping matrices 120, 134).

At block 710, training module 302 can determine a relevance loss value (e.g., Equation (3)) based on relative distance of mapped video descriptions and mapped sentence semantics within the embedding spaces.

At block 712, training module 302 can determine coherence loss value based on a sentence matrix (e.g., $D_w \times N_s$ matrix W). The coherence loss is only the sum of the negative log likelihood of the correct word at each step.

At block 714, training module 302 can input video and sentence information from the embedding space (e.g., 406, 408) into an LSTM-type RNN (e.g., LSTM 418). Training module 302 can instruct the LSTM-type RNN that output of the LSTM-type RNN is the input sentence. At an initial time step, the video representation in the embedding space is set as the input of LSTM. Then at the next steps, the embedding of the generated word at time t-1 will be fed into the LSTM to predict the next word at time t.

At decision block 716, training module 302 can repeat process 700 the inputted video/sentence pair, until the relevance loss and/or coherence loss drops below a threshold or a predefined number of repeats of process 700 have occurred.

At block 718, training module 302 can adjust the matrices in order to reduce one or both of relevance loss and coherence loss based on execution of the LSTM-type RNN.

At block 720, the process can be repeated.

Training module 302 repeats process 700 for other predefined input video/sentence pairs, if the condition of decision block 716 has been met. The result of the repetition of process 700 for many different input video/sentence pairs produces mapping/transformation matrices that are highly effective for generating description sentences for inputted video.

Figure 8:
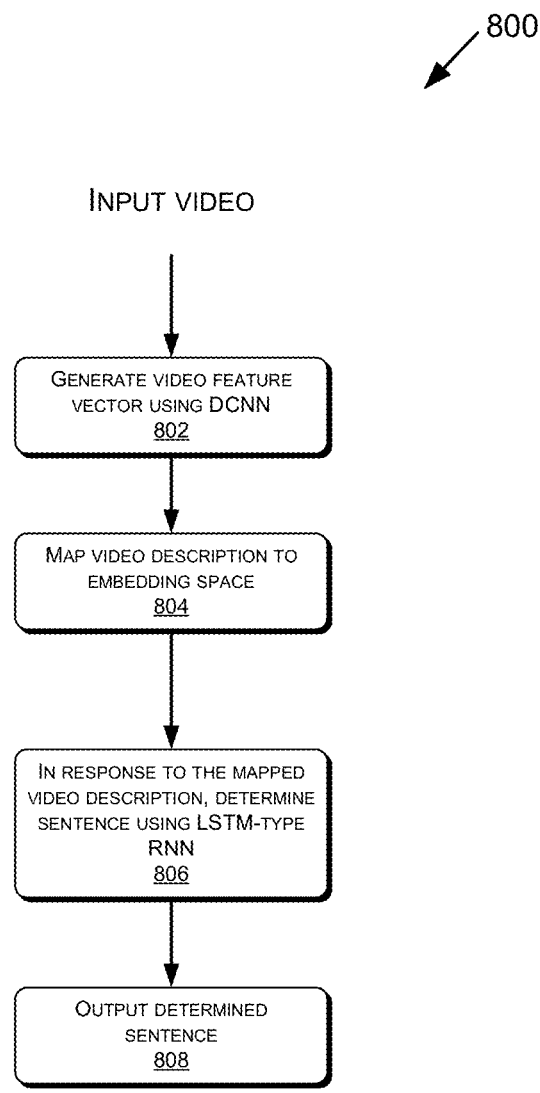
FIG. 8 shows a flow diagram of video description generation using at least the components trained in the process of FIG. 7.

FIG. 8 illustrates an example process 800 for identifying a sentence that describes a video inputted/identified by a consumer. At block 802, video detection module 204, 304 can generate a video feature vector of the consumer inputted/identified video using the DCNN(s) used at block 702 or a comparable DCNN(s).

At block 804, video detection module 204, 304 can map the video feature vector to embedding space using the video mapping matrix trained by the training module 302.

At block 806, video detection module 204, 304 can use the LSTM-type RNN and the sentence mapping matrix trained by the training module 302 to determine a sentence. Because training module 302 determines the video and sentence mapping matrices for minimizing relevance loss and coherence loss, the LSTM-type RNN is highly effective at predicting the sentence for the inputted video.

At block 808, video detection module 204, 304 can output the determined sentence for use by various applications. For example, video output module 206, 306 can present the determined sentence to the consumer via display 110-5 and/or output interface(s) 110-6. In another example, video output module 206, 306 can output the determined sentence to a search engine and/or a searchable database. The entries in the searchable database may include the determined sentence and an address/link for the associated input video. This allows the inputted video to be searchable by other consumers.

Variations of the above described examples compare favorably to several prior works on action recognition and video description generation tasks. A comparison between prior works in the above examples uses many snippets which cover a wide range of daily activities such as "people doing exercises," "playing music," and "cooking." The comparison includes LSTM-E architecture with two 2-D CNN of AlexNet and a 19-layer VGG network both pre-trained on Imagenet ILSVRC12 dataset, and one 3-D CNN of C3D pre-trained on a sports video dataset. VGG and C3D is a kind of 2D and 3D CNNs, respectively. The dimensionality of the visual-semantic embedding space and the size of hidden layer in LSTM are both set to 512. The tradeoff parameter $\lambda$ leveraging the relevance loss and coherence loss is empirically set to 0.7.

The comparison can compare LSTM-E models with the following baseline methods.

Conditional Random Field (CCF): CRF model can incorporate subject-verb and verb-object pairwise relationship based on the word pairwise occurrence statistics in the sentence pool.

Canonical Correlation Analysis (CCA): CCA can build the video-language joint space and generate the subject, verb, object (SVO) triplet by k-nearest-neighbors search in the sentence pool.

Factor Graph Model (FGM): FGM combines knowledge mined from text corpora with visual confidence using a factor graph and performs probabilistic inference to determine the most likely SVO triplets.

Joint Embedding Model (JEM): JEM can jointly model video and the corresponding text sentences by minimizing the distance of the deep video and compositional text in the joint space.

LSTM: LSTM attempts to directly translate from video pixels to natural language with a single deep neural network. The video representation uses mean pooling over the features of frames using AlexNet.

As SVO triplets can capture the compositional semantics of videos, predicting SVO triplet could indicate the quality of a translation system to a large extent.

SVO accuracy measures the exactness of SVO words by binary (0-1 loss), as the evaluation metric. Table 1 details SVO accuracy of the compared six models. Within these models, the first four models (called item driven models) explicitly optimize to identify the best SVO items for a video; while the last two models (named sentence driven models) focus on training on objects and actions jointly in a sentence and learn to interpret these in different contexts.

TABLE 1

| Model | S % | V % | O % |
| --- | --- | --- | --- |
| FGM | 76.42 | 21.34 | 12.39 |
| CRF | 77.16 | 22.54 | 9.25 |
| CCA | 77.16 | 21.04 | 10.99 |
| JEM | 78.25 | 24.45 | 11.95 |
| LSTM | 71.19 | 19.40 | 9.70 |
| LSTM-E (VGG + C3D) | 80.45 | 29.85 | 13.88 |

For the last two sentence driven models, the comparison extracts the SVO triplets from the generated sentences by Stanford Parser1 and stems the words. Overall, the results across SVO triplet indicate that almost all the four item driven models exhibit better performance than LSTM model which predicts the next word by only considering the contextual relationships with the previous words given the video content. By jointly modeling the relevance between the semantics of the entire sentence and video content with LSTM, LSTM-E significantly improves LSTM. Furthermore, the performance of LSTM-E (VGG+C3D) on SVO is better that of the four item driven models.

For item driven models including FGM, CRF, CCA and JEM, the sentence generation is often performed by leveraging a series of simple sentence templates (or special language trees) on the SVO triplets. Using LSTM architecture can lead to a large performance boost against the template-based sentence generation. Table 2 shows comparisons of LSTM-based sentence generations. The comparison uses the BLEU@N and METEOR scores against all ground truth sentences.

TABLE 2

| Model | Meteor | Blue@1 | Blue@2 |
| --- | --- | --- | --- |
| LSTM | 26.9 | 74.5 | 59.8 |
| LSTM-E (VGG + C3D) | 31.0 | 78.8 | 66.0 |

BLEU@N measures the fraction of N-gram (up to 4-gram) that are in common between a hypothesis and a reference or set of references, while METEOR computes unigram precision and recall, extending exact word matches to include similar words based on WordNet synonyms and stemmed tokens. As shown in Table 2, the qualitative results across different N of BLEU and METEOR consistently indicate that the LSTM-E (VGG+C3D) significantly outperforms the traditional LSTM model. Moreover, the comparison finds that the performance gain of BLEU@N becomes larger when N increases, where N measures the length of the contiguous sequence in the sentence. This again confirms that LSTM-E is benefited from how it explores the relationships between the semantics of the entire sentence and video content by minimizing the distance of their mappings in a visual-semantic embedding space.

Figure 9:
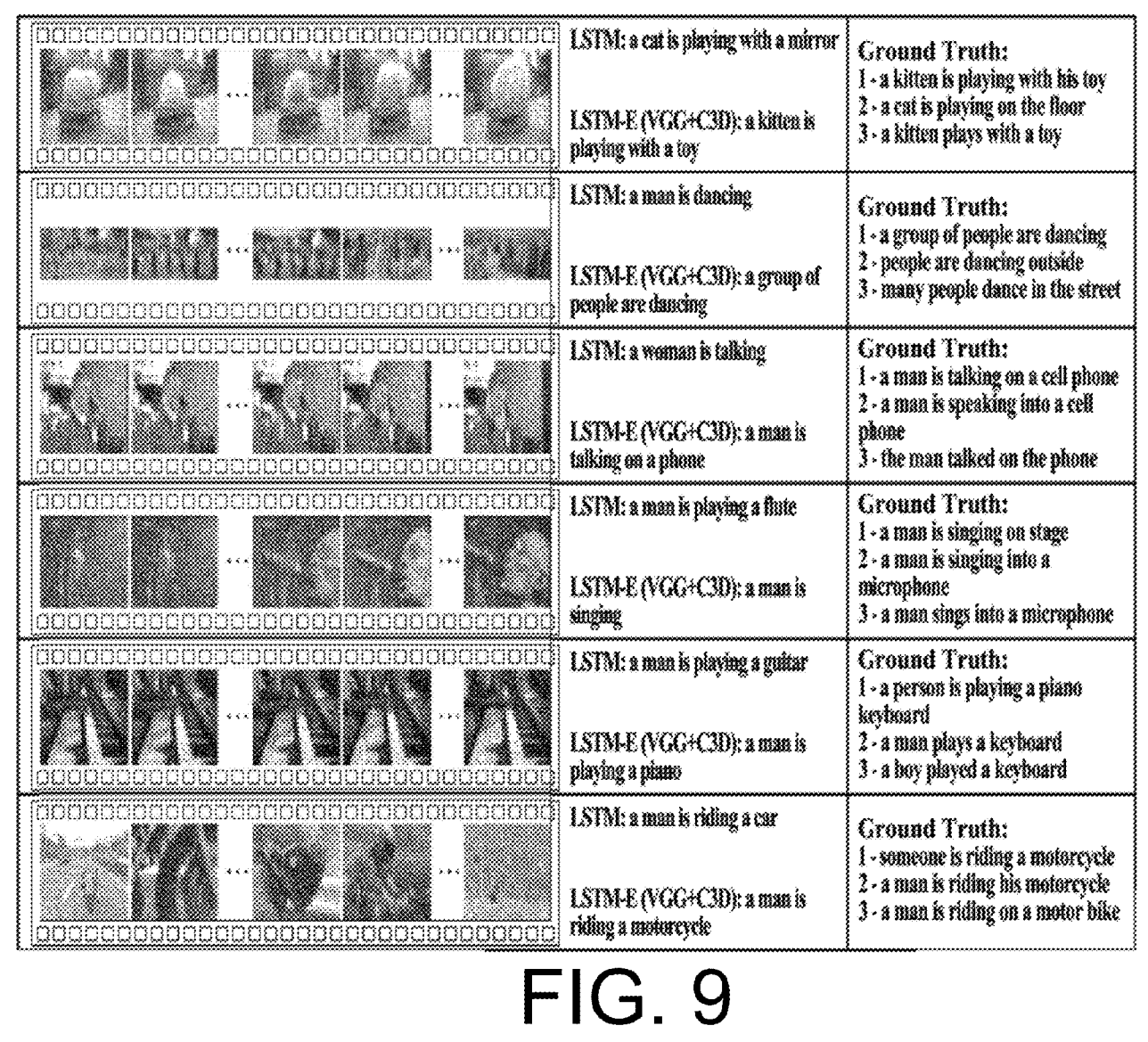

FIG. 9 shows a few sentence examples generated by different methods and human-annotated ground truth. From these exemplar results, all of these automatic methods can generate somewhat relevant sentences. When looking into each word, LSTM-E (VGG+C3D) predicts more relevant SVO terms. For example, compared to subject to describe the video content in the second video. Similarly, verb term "singing" presents the fourth video more exactly. The predicted object terms "keyboard" and "motorcycle" are more relevant than "guitar" and "car" in fifth and sixth videos, respectively. Moreover, LSTM-E (VGG+C3D) offers more coherent sentences. For instance, the generated sentence "a man is talking on a phone" of the third video encapsulates the video content more clearly.

The results shown above demonstrate the success of the LSTM-E approach, outperforming the current state-of-the-art model with a significantly large margin on both SVO prediction and sentence generation.

The comparison analyzes on the effect of the tradeoff parameter between two losses and the size of hidden layer in LSTM learning.

Figure 10:
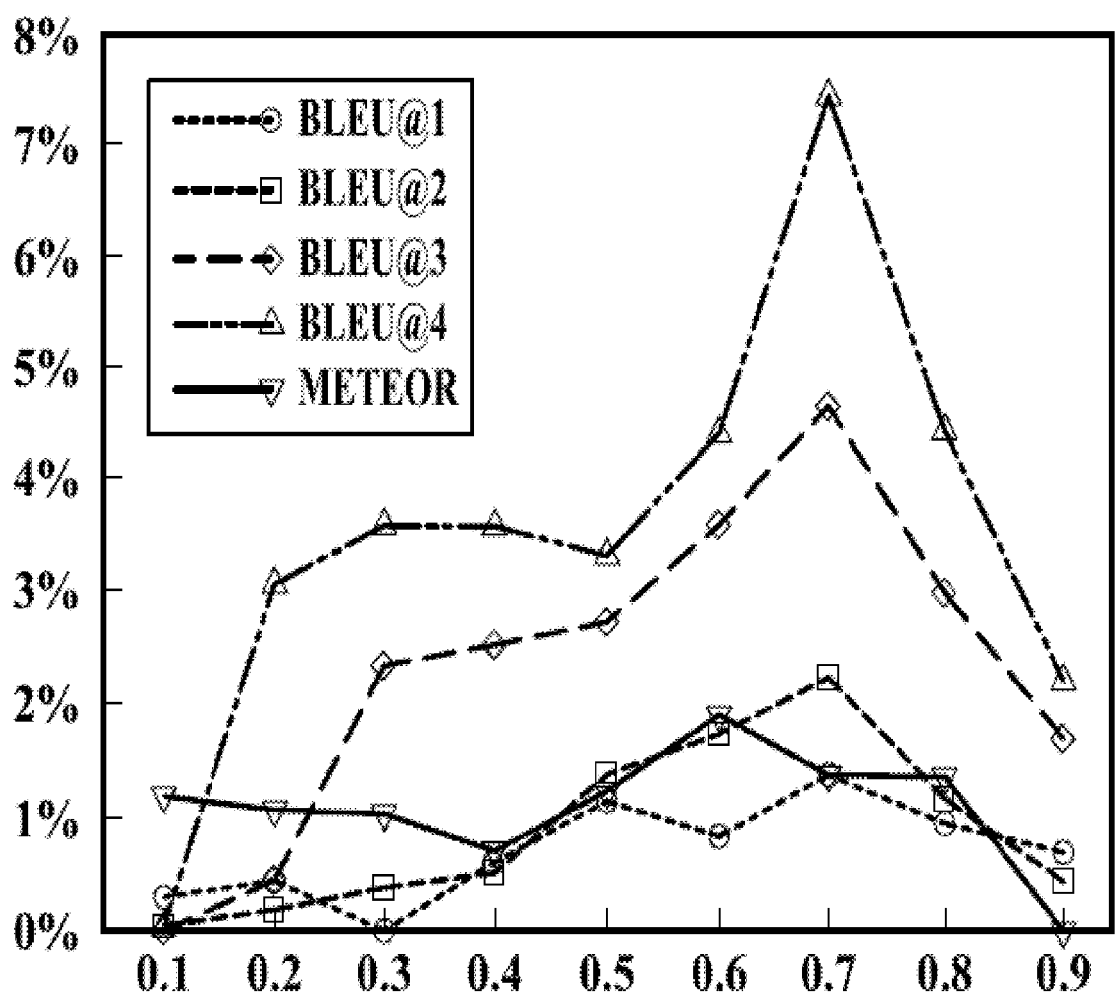
FIG. 10 is a graph showing performance using different parameter values.

To clarify the effect of the tradeoff parameter λ in Eq. (11), performance curves with different tradeoff parameters are shown in FIG. 10. To make all performance curves fall into a comparable scale, all BLEU@N and METEOR values are specially normalized as follows $$m'_\lambda = \frac{m_\lambda - \min_\lambda\{m_\lambda\}}{\min_\lambda\{m_\lambda\}} \quad (13)$$

where $m_\lambda$ and $m'_\lambda$ denotes original and normalized performance values (BLEU@N or METEOR) with a set of λ, respectively.

The performance curves exhibit a "Λ" shape when λ varies in a range from 0.1 to 0.9. The best performance is achieved when λ is about 0.7. This proves that it is reasonable to jointly learn the visual semantic embedding space in the deep recurrent neural networks In order to show the relationship between the performance and hidden layer size of LSTM, the comparison analyzes the results of the hidden layer size in the range of 128, 256, and 512. Therefore, the hidden layer size is empirically set to 512, which achieves the best performance.

EXAMPLE CLAUSES

An apparatus comprising: a processor; and a computer-readable medium storing modules of instructions that, when executed by the processor, configure the apparatus to perform video description generation, the modules comprising: a training module to configure the processor to train at least one of a neural network, a video content transformation matrix or a semantics transformation matrix based at least in part on a plurality of video/descriptive text pairs, a coherence loss threshold or a relevance loss threshold; a video description module to configure the processor to generate a textual description for an inputted video based at least in part on information associated with the inputted video, the neural network, the video content transformation matrix and the semantics transformation matrix; and an output module to configure the processor to generate an output based at least in part on the textual description for the inputted video.

The apparatus in any of the preceding clauses, wherein the descriptive text of the plurality of video/descriptive text pairs comprises a sentence.

The apparatus in any of the preceding clauses, wherein the training module is further to configure the processor to: determine an energy value for a first of the plurality of video/descriptive text pairs based at least on the transformation matrices; apply the energy value to a recurrent neural network (RNN); and adjust one or more parameters associated with the transformation matrices in response to the energy value being applied to the RNN.

The apparatus in any of the preceding clauses, wherein the training module is further to configure the processor to: determine an energy value for a first of the plurality of video/descriptive text pairs based at least on the transformation matrices; apply the energy value to a long short-term memory (LSTM)-type recurrent neural network (RNN); and adjust one or more parameters associated with the transformation matrices in response to the energy value being applied to the LSTM-type RNN.

The apparatus in any of the preceding clauses, wherein the training module is further to configure the processor to: determine a feature vector of the video of a first of the plurality of video/descriptive text pairs; project the feature vector of the video to an embedding space using the video content transformation matrix; determine semantics of the descriptive text of the first of the plurality of video/descriptive text pairs; project the semantics of the descriptive text to the embedding space using the semantics transformation matrix; determine a relevance loss value based at least in part on the projection of the feature vector of the video and the projection of the semantics of the descriptive text; determine a coherence loss value based at least in part on the projection of the feature vector of the video and the projection of the semantics of the descriptive text; and generate a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value based at least in part on the relevance loss threshold or coherence loss threshold.

The apparatus in any of the preceding clauses, wherein the output module is further to configure the processor to: configure the output for inclusion in a searchable database.

The apparatus in any of the preceding clauses, wherein the training module is further to configure the processor to: determine a feature vector of video of a first of the plurality of video/descriptive text pairs using at least one of a 2D convolutional neural network (CNN) or 3D CNN.

A system comprising: a processor; and a computer-readable media including instructions that, when executed by the processor, configure the processor to: train at least one of a neural network, a video content transformation matrix or a semantics transformation matrix based at least in part on a plurality of video/descriptive text pairs, a coherence loss threshold or a relevance loss threshold; generate a textual description for an inputted video based at least in part on information associated with the inputted video, the neural network, the video content transformation matrix and the semantics transformation matrix; and generate an output based at least in part on the textual description for the inputted video.

The system in any of the preceding clauses, wherein the textual description comprises a sentence.

The system in any of the preceding clauses, wherein the computer-readable media includes further instructions that, when executed by the processor, further configure the processor to: determine an energy value for a first of the plurality of video/descriptive text pairs based at least on the transformation matrices; apply the energy value to a recurrent neural network (RNN); and adjust one or more parameters associated with the transformation matrices in response to the energy value being applied to the RNN.

The system in any of the preceding clauses, wherein the computer-readable media includes further instructions that, when executed by the processor, further configure the processor to: determine an energy value for a first of the plurality of video/descriptive text pairs based at least on the transformation matrices; apply the energy value to a long short-term memory (LSTM)-type recurrent neural network (RNN); and adjust one or more parameters associated with the transformation matrices in response to the energy value being applied to the LSTM-type RNN.

The system in any of the preceding clauses, wherein the computer-readable media includes further instructions that, when executed by the processor, further configure the processor to: determine a representation of the video of a first of the plurality of video/descriptive text pairs; project the representation of the video to an embedding space using the video content transformation matrix; determine a semantics representation of the descriptive text of the first of the plurality of video/descriptive text pairs; project the semantics representation of the descriptive text to the embedding space using the semantics transformation matrix; determine a relevance loss value based at least in part on the projection of the representation of the video and the projection of the semantics representation of the descriptive text; determine a coherence loss value based at least in part on the projection of the representation of the video and the projection of the semantics representation of the descriptive text; and generate a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value based at least in part on the relevance loss threshold or coherence loss threshold.

The system in any of the preceding clauses, wherein the computer-readable media includes further instructions that, when executed by the processor, further configure the processor to: configure the output for inclusion in a searchable database.

The system in any of the preceding clauses, wherein the computer-readable media includes further instructions that, when executed by the processor, further configure the processor to: determine content of video of a first of the plurality of video/descriptive text pairs using at least one of a 2D convolutional neural network (CNN) or 3D CNN.

A method comprising: training at least one of a neural network, a video content transformation matrix or a semantics transformation matrix based at least in part on a plurality of video/descriptive text pairs, a coherence loss threshold or a relevance loss threshold; generating a textual description for an inputted video based at least in part on information associated with the inputted video, the neural network, the video content transformation matrix and the semantics transformation matrix; and generating an output based at least in part on the textual description for the inputted video.

The method in any of the preceding clauses, further comprising: determining an energy value for a first of the plurality of video/descriptive text pairs based at least on the transformation matrices; applying the energy value to a long short-term memory (LSTM)-type recurrent neural network (RNN); and adjusting one or more parameters associated with the transformation matrices in response to the energy value being applied to the LSTM-type RNN.

The method in any of the preceding clauses, further comprising: determining a representation of the video of a first of the plurality of video/descriptive text pairs; projecting the representation of the video to an embedding space using the video content transformation matrix; determining semantics of the descriptive text of the first of the plurality of video/descriptive text pairs; projecting the semantics of the descriptive text to the embedding space using the semantics transformation matrix; determining a relevance loss value based at least in part on the projection of the representation of the video and the projection of the semantics of the descriptive text; determining a coherence loss value based at least in part on the projection of the representation of the video and the projection of the semantics of the descriptive text; and generating a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value.

The method in any of the preceding clauses, wherein the textual description and the descriptive text of the plurality of video/descriptive text pairs comprises a sentence.

The method in any of the preceding clauses, further comprising: configuring the output for inclusion in a searchable database.

The method in any of the preceding clauses, further comprising: determining a representation of video of a first of the plurality of video/descriptive text pairs using at least one of a 2D convolutional neural network (CNN) or 3D CNN.

A system comprising: a means for training at least one of a neural network, a video content transformation matrix or a semantics transformation matrix based at least in part on a plurality of video/descriptive text pairs, a coherence loss threshold or a relevance loss threshold; a means for generating a textual description for an inputted video based at least in part on information associated with the inputted video, the neural network, the video content transformation matrix and the semantics transformation matrix; and a means for generating an output based at least in part on the textual description for the inputted video.

The system in any of the preceding clauses, further comprising: a means for determining an energy value for a first of the plurality of video/descriptive text pairs based at least on the transformation matrices; a means for applying the energy value to a long short-term memory (LSTM)-type recurrent neural network (RNN); and a means for adjusting one or more parameters associated with the transformation matrices in response to the energy value being applied to the LSTM-type RNN.

The system in any of the preceding clauses, further comprising: a means for determining a representation of the video of a first of the plurality of video/descriptive text pairs; a means for projecting the representation of the video to an embedding space using the video content transformation matrix; a means for determining semantics of the descriptive text of the first of the plurality of video/descriptive text pairs; a means for projecting the semantics of the descriptive text to the embedding space using the semantics transformation matrix; a means for determining a relevance loss value based at least in part on the projection of the representation of the video and the projection of the semantics of the descriptive text; a means for determining a coherence loss value based at least in part on the projection of the representation of the video and the projection of the semantics of the descriptive text; and a means for generating a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value.

The system in any of the preceding clauses, wherein the textual description and the descriptive text of the plurality of video/descriptive text pairs comprises a sentence.

The system in any of the preceding clauses, further comprising: a means for configuring the output for inclusion in a searchable database.

The system in any of the preceding clauses, further comprising: a means for determining a representation of video of a first of the plurality of video/descriptive text pairs using at least one of a 2D convolutional neural network (CNN) or 3D CNN.

Conclusion

Various concept expansion techniques described herein can permit more robust analysis of videos.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 104 or 106, such as one or more internal or external CPUs or GPUs, and/or one or more pieces of hardware logic such as FPGAs, DSPs, or other types described above.

All of the methods and processes described above can be embodied in, and fully automated via, software code modules executed by one or more computers or processors. The code modules can be stored in any type of computer-readable medium, memory, or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. An apparatus comprising:
   a processor; and
   a computer-readable medium storing modules of instructions that, when executed by the processor, configure the apparatus to perform video description generation, the modules comprising:
      a training module to configure the processor to train a neural network, a video content transformation matrix, and a semantics transformation matrix based at least in part on a plurality of video/descriptive text pairs, a coherence loss threshold, and a relevance loss threshold, the training module further configured to adjust one or more parameters associated with the semantics transformation matrix in response to an energy value being applied to a recurrent neural network;
      a video description module to configure the processor to generate a textual description for an inputted video based at least in part on information associated with the inputted video, the neural network, the video content transformation matrix and the semantics transformation matrix; and
      an output module to configure the processor to generate an output based at least in part on the textual description for the inputted video.

2. The apparatus of claim 1, wherein the descriptive text of individual ones of the plurality of video/descriptive text pairs comprises a sentence.

3. The apparatus of claim 1, wherein the training module is further to configure the processor to:
   determine an energy value for a first of the plurality of video/descriptive text pairs based at least on the video content transformation matrix and the semantics transformation matrix;
   apply the energy value to a recurrent neural network (RNN); and adjust one or more parameters associated with the transformation matrices in response to the energy value being applied to the RNN.

4. The apparatus of claim 1, wherein the training module is further to configure the processor to:
determine the energy value for a first of the plurality of video/descriptive text pairs based at least on the video content transformation matrix and the semantics transformation matrix;
apply the energy value to a long short-term memory (LSTM)-type recurrent neural network (RNN); and
adjust the one or more parameters associated with one or more of the transformation matrices in response to the energy value being applied to the LSTM-type RNN.

5. The apparatus of claim 1, wherein the training module is further to configure the processor to:
determine a feature vector of the video of a first of the plurality of video/descriptive text pairs;
project the feature vector of the video to an embedding space using the video content transformation matrix;
determine semantics of the descriptive text of the first of the plurality of video/descriptive text pairs;
project the semantics of the descriptive text to the embedding space using the semantics transformation matrix;
determine a relevance loss value based at least in part on the projection of the feature vector of the video and the projection of the semantics of the descriptive text;
determine a coherence loss value based at least in part on the projection of the feature vector of the video and the projection of the semantics of the descriptive text; and
generate a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value based at least in part on the relevance loss threshold or coherence loss threshold.

6. The apparatus of claim 1, wherein the output module is further to configure the processor to:
configure the output for inclusion in a searchable database.

7. The apparatus of claim 1, wherein the training module is further to configure the processor to:
determine a feature vector of video of a first of the plurality of video/descriptive text pairs using at least one of a two dimensional (2D) convolutional neural network (CNN) or three dimensional (3D) CNN.

8. A system comprising:
a processor; and
a computer-readable media including instructions that, when executed by the processor, configure the processor to:
train a neural network, a video content transformation matrix, and a semantics transformation matrix based at least in part on a plurality of video/descriptive text pairs, a coherence loss threshold, and a relevance loss threshold;
determine an energy value for a first of the plurality of video/descriptive text pairs based at least on the video content transformation matrix and the semantics transformation matrix;
generate a textual description for an inputted video based at least in part on information associated with the inputted video, the neural network, the video content transformation matrix and the semantics transformation matrix; and
generate an output based at least in part on the textual description for the inputted video.

9. The system of claim 8, wherein the textual description comprises a sentence.

10. The system of claim 8, wherein the computer-readable media includes further instructions that, when executed by the processor, further configure the processor to:
determine an energy value for a first of the plurality of video/descriptive text pairs based at least on the video content transformation matrix and the semantics transformation matrix;
apply the energy value to a recurrent neural network (RNN); and
adjust one or more parameters associated with the transformation matrices in response to the energy value being applied to the RNN.

11. The system of claim 8, wherein the computer-readable media includes further instructions that, when executed by the processor, further configure the processor to:
apply the energy value to a long short-term memory (LSTM)-type recurrent neural network (RNN); and
adjust one or more parameters associated with the video content transformation matrix and the semantics transformation matrix in response to the energy value being applied to the LSTM-type RNN.

12. The system of claim 8, wherein the computer-readable media includes further instructions that, when executed by the processor, further configure the processor to:
determine a representation of the video of a first of the plurality of video/descriptive text pairs;
project the representation of the video to an embedding space using the video content transformation matrix;
determine a semantics representation of the descriptive text of the first of the plurality of video/descriptive text pairs;
project the semantics representation of the descriptive text to the embedding space using the semantics transformation matrix;
determine a relevance loss value based at least in part on the projection of the representation of the video and the projection of the semantics representation of the descriptive text;
determine a coherence loss value based at least in part on the projection of the representation of the video and the projection of the semantics representation of the descriptive text; and
generate a long short-term memory (LSTM)-type recurrent neural network (RNN) modeled to identify a relationship between the video and the descriptive text of the first of the video/descriptive text pairs, wherein the LSTM-type RNN comprises one or more parameters optimized to minimize at least one of the relevance loss value or the coherence loss value based at least in part on the relevance loss threshold or coherence loss threshold.

13. The system of claim 8, wherein the computer-readable media includes further instructions that, when executed by the processor, further configure the processor to:
configure the output for inclusion in a searchable database.

14. The system of claim 8, wherein the computer-readable media includes further instructions that, when executed by the processor, further configure the processor to:

determine content of video of a first of the plurality of video/descriptive text pairs using at least one of a 2D convolutional neural network (CNN) or 3D CNN.

15. A method comprising:
training a neural network, a video content transformation matrix, and a semantics transformation matrix based at least in part on a plurality of video/descriptive text pairs, a coherence loss threshold, and a relevance loss threshold;
generating a textual description for an inputted video based at least in part on information associated with the inputted video, the neural network, the video content transformation matrix, and the semantics transformation matrix;
generating a recurrent neural network (RNN) model to identify a relationship between the video and the textual description of the inputted video, wherein the RNN comprises one or more parameters optimized to minimize at least one of a relevance loss value or a coherence loss value; and
generating an output based at least in part on the textual description for the inputted video.

16. The method of claim 15, further comprising:
determining an energy value for a first of the plurality of video/descriptive text pairs based at least on the video content transformation matrix and the semantics transformation matrix;
applying the energy value to a long short-term memory (LSTM)-type recurrent neural network (RNN); and
adjusting one or more parameters associated with the video content transformation matrix and the semantics transformation matrix in response to the energy value being applied to the LSTM-type RNN.

17. The method of claim 15, further comprising:
determining a representation of the video of a first of the plurality of video/descriptive text pairs;
projecting the representation of the video to an embedding space using the video content transformation matrix;
determining semantics of the descriptive text of the first of the plurality of video/descriptive text pairs;
projecting the semantics of the descriptive text to the embedding space using the semantics transformation matrix;
determining the relevance loss value based at least in part on the projection of the representation of the video and the projection of the semantics of the descriptive text;
determining the coherence loss value based at least in part on the projection of the representation of the video and the projection of the semantics of the descriptive text; and
wherein generating the RNN model includes generating a long short-term memory type recurrent neural network (LSTM type-RNN) modeled to identify a relationship between the video and the descriptive text of the first of the video/descriptive text pairs, wherein the LSTM-type RNN comprises the one or more parameters optimized to minimize at least one of the relevance loss value or the coherence loss value.

18. The method of claim 15, wherein the textual description and the descriptive text of the plurality of video/descriptive text pairs comprises a sentence.

19. The method of claim 15, further comprising:
configuring the output for inclusion in a searchable database.

20. The method of claim 15, further comprising:
determining a representation of video of a first of the plurality of video/descriptive text pairs using at least one of a 2D convolutional neural network (CNN) or 3D CNN.

* * * * *